US009426907B2

(12) United States Patent
Karandikar et al.

(10) Patent No.: US 9,426,907 B2
(45) Date of Patent: Aug. 23, 2016

(54) CONTAINMENT SYSTEM FOR INTERNAL ARC GENERATED GASSES

(75) Inventors: Harshavardhan M. Karandikar, Longwood, FL (US); Robert S. Karnbach, Lake Mary, FL (US); Patrick Fischer-Carne, New Smyrna Beach, FL (US); Rahul Pawar, Lake Mary, FL (US)

(73) Assignee: ABB Technology AG, Zurich (CH)

( * ) Notice: Subject to any disclaimer, the term of this patent is extended or adjusted under 35 U.S.C. 154(b) by 364 days.

(21) Appl. No.: 13/977,929

(22) PCT Filed: Dec. 20, 2011

(86) PCT No.: PCT/US2011/065977
§ 371 (c)(1),
(2), (4) Date: Jul. 2, 2013

(87) PCT Pub. No.: WO2012/088009
PCT Pub. Date: Jun. 28, 2012

(65) Prior Publication Data
US 2013/0306342 A1    Nov. 21, 2013

Related U.S. Application Data

(60) Provisional application No. 61/425,484, filed on Dec. 21, 2010.

(51) Int. Cl.
*H05K 5/00* (2006.01)
*H05K 7/00* (2006.01)
(Continued)

(52) U.S. Cl.
CPC .............. *H05K 5/0213* (2013.01); *H02B 1/565* (2013.01); *H02B 13/025* (2013.01)

(58) Field of Classification Search
CPC .................................. H02B 13/025; H02B 1/56
USPC ................................ 361/679.01–679.03, 678
See application file for complete search history.

(56) References Cited

U.S. PATENT DOCUMENTS 5,020,276 A   6/1991  Zittell
5,574,624 A   11/1996 Rennie et al.
(Continued)

OTHER PUBLICATIONS

Search Report in PCT/US2011/065977 dated May 4, 2012.
(Continued)

*Primary Examiner* — Jerry Wu
(74) *Attorney, Agent, or Firm* — Manelli Selter PLLC; Edward J. Stemberber

(57) ABSTRACT

A containment system for internal arc generated gasses includes a compartment having an aperture through a wall thereof. A bus compartment includes an opening through a wall thereof. Arc chamber is in communication with the aperture and the opening. A vent flap member closes the opening and is moveable to an open position to permit gasses to flow through the opening into the arc chamber. Flap structure is associated with the aperture and includes a plurality of interconnected flaps for moving generally simultaneously from an open position, permitting gasses to flow through the aperture into the arc chamber, to a closed position, closing the aperture to prevent gasses from flowing through the aperture. The flap structure includes actuating structure coupled with the interconnected flaps. The vent flap member, when moved to the open position thereof, engages the actuating structure to move the interconnected flaps to the closed position thereof.

20 Claims, 4 Drawing Sheets

(51) Int. Cl.
*H05K 5/02* (2006.01)
*H02B 1/56* (2006.01)
*H02B 13/025* (2006.01)

(56) References Cited

U.S. PATENT DOCUMENTS

| | | |
|---|---|---|
| 5,689,097 A | 11/1997 | Aufermann |
| 5,710,402 A | 1/1998 | Karnbach |
| 6,407,331 B1 * | 6/2002 | Smith et al. ..................... 174/50 |
| 6,602,014 B2 | 8/2003 | Lee |
| 7,952,857 B1 * | 5/2011 | Motley et al. ................. 361/678 |

OTHER PUBLICATIONS

International Preliminary Report on Patentability in PCT/US2012/049412 dated Feb. 25, 2014.

* cited by examiner

CONTAINMENT SYSTEM FOR INTERNAL ARC GENERATED GASSES

BACKGROUND OF THE INVENTION

The present invention relates to an electrical switchgear and, more particularly, to an arc-resistant enclosure for a switchgear and a ventilation system therefor.

Internal arc faults in an arc-resistant switchgear enclosure generate high pressures due to expanding gasses. These gasses are vented from the switchgear enclosure into an exhaust plenum. Typically, there is a vent opening between the breaker compartment and the vent compartment and a flap can cover the opening. The opening from the breaker compartment to the vent chamber is normally open to let the arc gasses escape from the breaker compartment into the vent chamber. The normally open configuration is required for high amperage switchgear (2000 A & above) in order to dissipate the heat generated in the breaker compartment.

For a Type 2C switchgear construction, as defined in the arc-resistant testing standard IEEE C37.20.7, no arc gasses are allowed to penetrate a compartment once they leave the one where the arc fault is created. This is a technically challenging requirement to meet. When the arc gasses flow through an arc chamber to the exhaust plenum, the opening to a breaker compartment (excluding the one where a fault may have occurred) must be closed so that no gasses will enter. It is not possible to have sealed compartments to prevent such entry of gasses since it would lead to unacceptable temperature rise within the compartments.

Thus, there is a need to provide an improved switchgear enclosure that ensures that heat convection can occur under normal operating conditions and yet ensure that compartments become isolated when the arc gasses flow into the arc chamber due to arc faults in other compartments.

SUMMARY OF THE INVENTION

An objective of the present invention is to fulfill the need referred to above. In accordance with the principles of the invention, this objective is obtained by providing a containment system for internal arc generated gasses. The system includes at least one compartment for housing electrical components. The compartment has an aperture through a wall thereof. A bus compartment is provided for housing a main bus. The bus compartment includes an opening through a wall thereof. An arc chamber is in communication with the aperture and the opening. At least one vent flap member is associated with the opening so as to normally close the opening. The vent flap member is moveable to an open position to permit gasses to flow through the opening into the arc chamber. Flap structure is associated with the aperture. The flap structure includes a plurality of interconnected flaps constructed and arranged to move generally simultaneously from an open position, permitting gasses to flow through the aperture into the arc chamber, to a closed position, closing the aperture to prevent gasses from flowing through the aperture and into the compartment. The flap structure includes actuating structure coupled with the interconnected flaps. The vent flap member, when moved to the open position thereof, is constructed and arranged to engage the actuating structure to move the interconnected flaps to the closed position thereof.

In accordance with another aspect of the present invention, a method is provided for containing internal arc gasses in a switchgear enclosure. The enclosure includes at least one compartment for housing electrical components. The compartment has an aperture through a wall thereof. The enclosure also includes a bus compartment for housing a main bus. The bus compartment includes an opening through a wall thereof. An arc chamber is in communication with the aperture and the opening. At least one vent flap member is associated with the opening so as to normally close the opening. The vent flap member is moveable to an open position to permit gasses to flow through the opening into the arc chamber. The method provides closure structure associated with the aperture and constructed and arranged to move from an open position, permitting gasses to flow through the aperture into the arc chamber, to a closed position, closing the aperture to prevent gasses from flowing through the aperture and into the compartment. The method ensures that when moved to the open position thereof, the vent flap member engages a portion of the closure structure to cause the closure structure to move to the closed position thereof.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
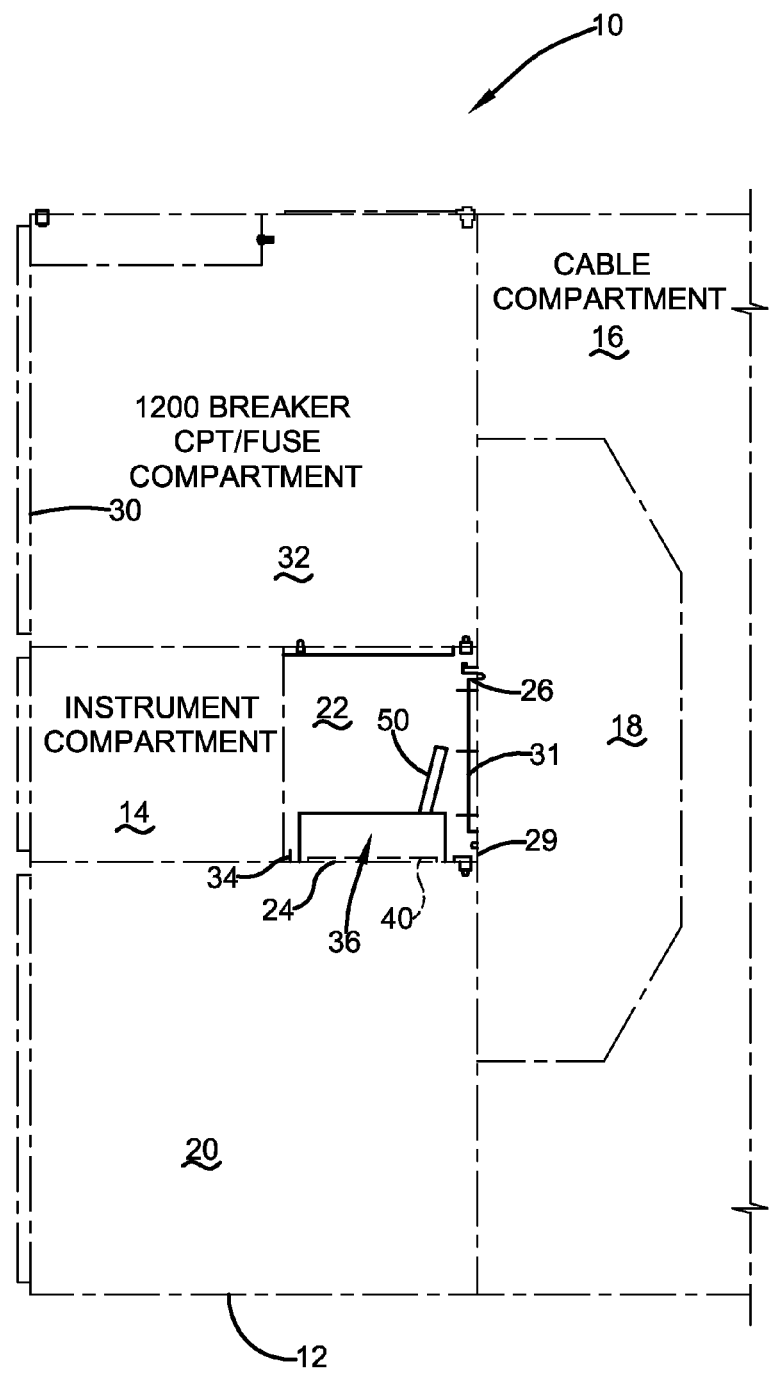
FIG. 1 is a schematic illustration of a switchgear enclosure in accordance with an embodiment of the invention.

With reference to FIG. 1 a switchgear enclosure is shown, generally indicated at 10, in accordance with an example embodiment. The enclosure 10 can be of the type disclosed in U.S. Pat. No. 5,689,097, the content of which is hereby incorporated by reference into this specification. Thus, FIG. 1 is a schematic of a two-high 1200 A-2000 A/3000 A breaker configuration with the enclosure 10 defining a 2000 A/3000 A circuit breaker compartment 12. Compartment 12 is positioned beneath an instrument compartment 14 for low voltage equipment and adjacent to a cable compartment 16 and a bus compartment 18. A circuit breaker 20 is shown within compartment 12.

An arc chamber 22 is positioned above the compartment 12 and to the right of compartment 14. Each of the compartments 12 and 18 has a respective aperture or opening 24, 26 so as to communicate with the arc chamber 22. In the embodiment, the arc chamber 22 is in communication with a second circuit breaker compartment 30 that houses a 1200 A breaker 32.

In the conventional manner, the opening 26 in the wall 29 of the bus compartment 18 is normally closed by at least one hinged vent flap member 31. When pressure increases in the bus compartment 18 due to an arc fault therein, the vent flap member 31 will automatically move to an opened position to allow the gasses to flow through the opening 26 and out of the bus compartment and into the arc chamber 22.

The configuration of the circuit breaker compartment 30 for a Type 2C arc resistant switchgear enclosure must meet two conflicting requirements. First, the enclosure 10 must provide enough openings to permit air circulation so as to promote heat transfer and prevent bus temperature rise beyond that allowed by the IEEE standard. Since the area around interrupter assemblies (assembled or embedded poles) and a connection between the breaker contact arms and the main bus is usually the hottest, the large aperture 24 is provided at the top wall 34 of the breaker compartment 12. This aperture 24 communicates with the arc chamber 22 in which the arc gasses enter in the event of an arc fault in the breaker compartment 12. This permits the pressure and hot gases to be released without the risk of injury to personnel who might be working near the switchgear. Second, in the event of an arc fault in other compartments in a switchgear line-up (circuit breaker, main bus, etc.) this aperture 24 must be closed so as to prevent ingress of gasses into compartment 12.

Figure 2:
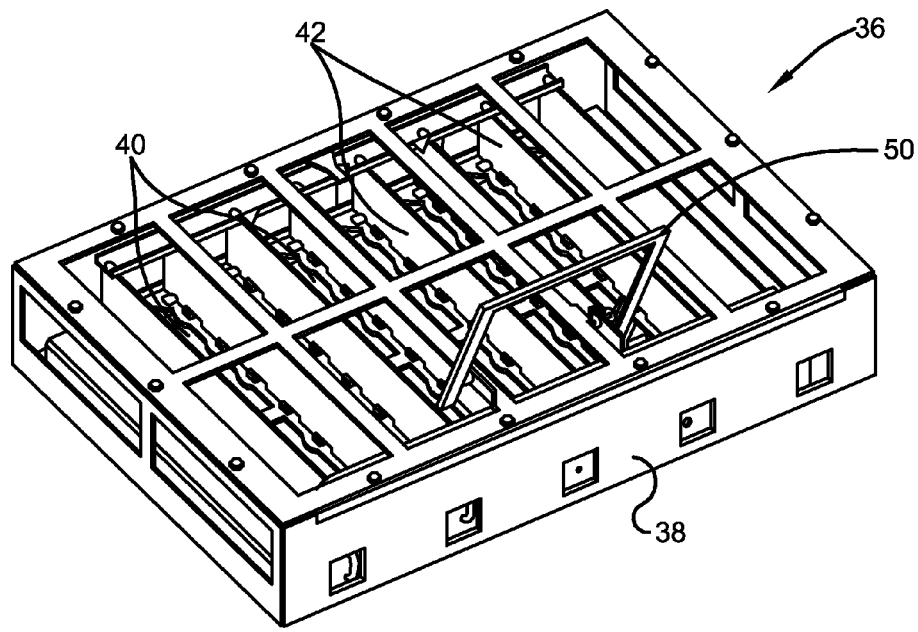
FIG. 2 is a perspective view of flap structure that is provided in the enclosure of FIG. 1.
Figure 3:
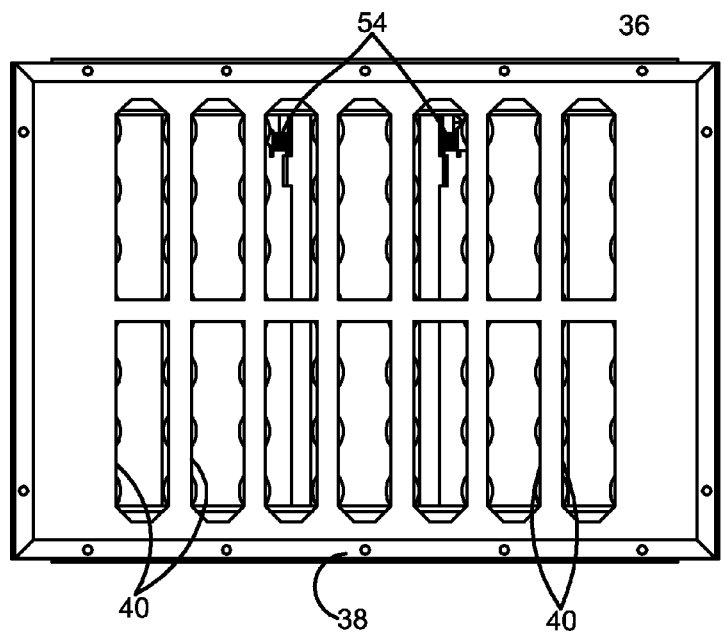
FIG. 3 is a bottom view of the flap structure of FIG. 3.

In accordance with an embodiment, the aperture 24 is closed via closure or vent flap structure, generally indicated at 36, disposed in the arc chamber 22 for closing the aperture 24 under certain conditions. FIG. 2 shows the flap structure 36 removed from the arc chamber 22 for clarity of illustration. The flap structure 36 includes a box-like housing 38 that is disposed over the aperture 24. FIG. 3 is a bottom view of the housing 38. The housing 38 includes a plurality of vent openings 40 therein that communicate with the aperture 24. In the broadest aspect of the embodiment, the vent openings 40 can be considered to be part of the aperture 24. Returning to FIG. 2, the flap structure 36 also includes a plurality of interconnected flaps 42 provided in the housing 38 so that one flap 42 is associated with one vent opening 40. As shown in FIG. 2, each flap 42 is normally disposed transversely with respect to the associated vent opening 40 (e.g. vertically disposed) in an open position to keep the vent openings 40 and thus aperture 24 in the breaker compartment 30 open for heat convection. The flaps 42 are preferably thin, generally rectangular, sheet-metal structures.

Figure 4:
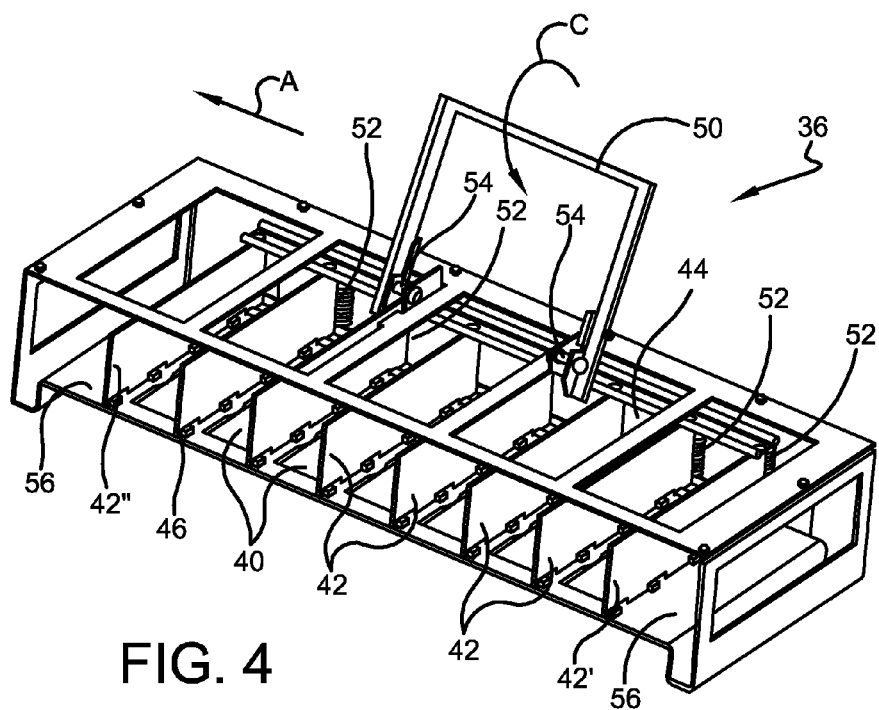
FIG. 4 is a partial view of the flap structure of FIG. 2 showing the flap actuating structure thereof.

FIG. 4 is a partial view of the flap structure 36 closing of the flaps 42 generally simultaneously. The flap structure 36 includes at least one link 44 attached to an end of each flap 42, for example, in the manner of a conventional tilt rod of a window shutter. Thus, as the link 44 is moved linearly in the direction of arrow A (or in the opposite direction) of FIG. 4, the flaps 42 will pivot about a hinge structure, generally indicated at 46 (FIG. 6), and move simultaneously to a horizontal or closed position, closing the vent openings 40 and thus closing the aperture 24.

Figure 6:
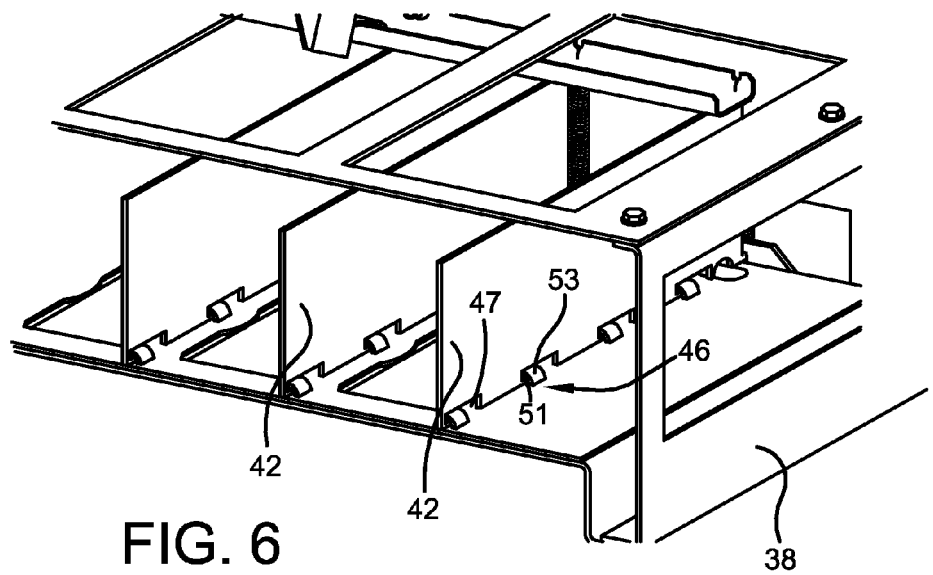
FIG. 6 is a partial view of the flap structure of FIG. 2 showing the hinge structure thereof.

As best shown in FIG. 6, each flap 42 is hinged at the junction of the housing 38 and a bottom edge of the flap 42 via two overlapping members. The flaps 42 define at least one detent opening 47 and the flaps 42 are affixed to a surface 49, of the housing 38, which has no detent opening. The detent openings of the flaps 42 receive the knuckle of a hinge 53 that interlocks with at least one pin structure 51 to form the hinge structure 46. This hinge structure 46 allows the flaps 42 to lay flat generally sealing against the housing surface 49 in both directions of rotation about this hinge structure 52 when in the closed position thereof, as explained more fully below.

Figure 7:
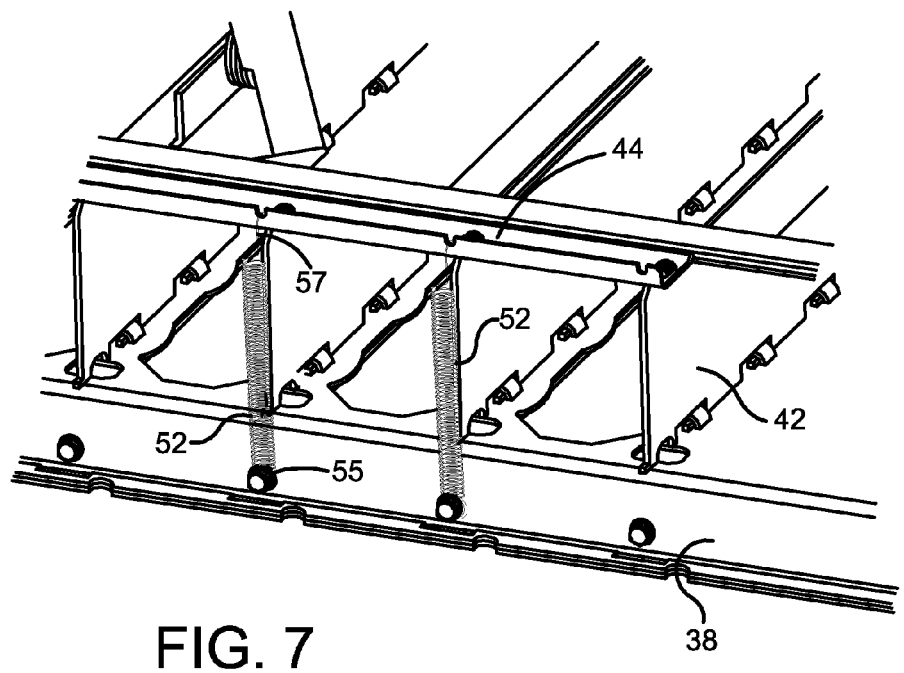
FIG. 7 is a partial view of the flap structure of FIG. 2 showing springs for ensuring fast closing of the flap structure.

As best shown in FIG. 7, four springs 52 are associated with the flaps 42 to bias the flaps 42 to the closed position thereof, as explained more fully below. FIG. 7 shows a pair of springs 52 with one end 55 thereof coupled to the housing 38 and the end thereof coupled to the link 44.

As the arc gasses from adjoining compartments flows in the direction A into the arc chamber 22, the first flap 42' closes due to the flow pressure (see FIG. 4). Since all the flaps 42 are interconnected via link 44, all of the flaps 42 start moving and after certain amount of rotation, springs 52 take over the rotation and pull the flaps 42 to the closed position, thus, closing the vent openings 40 and aperture 24. Thus, the springs 52 are provided and ensure faster closing of the flaps 42 and also prevent the flaps 42 from bouncing back, once closed.

As the arc gasses from adjoining compartments flows in a direction opposite of direction A and into the arc chamber 22, the first flap 42" closes due to the flow pressure (see FIG. 4). Since all the flaps 42 are interconnected via link 44, all of the flaps 42 start moving and after certain amount of rotation, springs 52 take over the rotation and pull the flaps 42 to closed position, thus, closing the vent openings 40 and the aperture 24. Again, springs 52 prevent the flaps from bouncing back, once closed.

Figure 5:
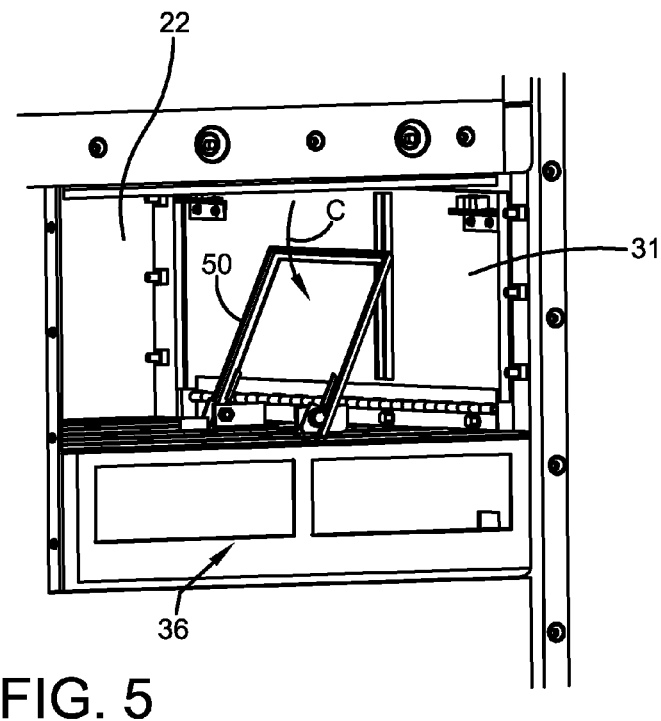
FIG. 5 is a view showing the flap members of the main bus compartment engaging the lever of the flap structure.

When an arc fault happens in the main bus compartment 18 (e.g., in case of a 2000 A continuous current rated construction) the flap member 31 that vents the main bus compartment 18 open and must shut the flaps 42 to close the aperture 24. This is ensured by providing actuating structure that preferably includes a lever 50 that extends from the housing 38. The lever 50 gets pushed by the flap member 31 (FIG. 5) when the flap member 31 moves to the open position. Since the lever 50 is coupled to the link 44, rotation of the lever 50 in the direction of arrow C causes linear movement of the link 44 in the direction of arrow A, thus moving the flaps 42 to the closed position.

Lever 50 is biased to the open position (flaps 42 in the open position) via at least one spring 54. The lever 50, link 44, and springs 52, 54 can be considered to be part of the actuating structure.

A small guard 56 is provided at each of the two ends of the housing 38 to prevent ingress of gasses through the seam between the compartment wall 34 (FIG. 1) and the sheet metal of the flaps 42, 48.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A containment system for internal arc generated gasses comprising: at least one compartment for housing electrical components, the at least one compartment having an aperture through a wall thereof, a bus compartment for housing a main bus, the bus compartment including an opening through a wall thereof, an arc chamber in communication with the aperture and the opening, at least one vent flap member associated with the opening so as to normally close the opening, the at least one vent flap member being moveable to an open position to permit gasses to flow through the opening into the arc chamber, and flap structure associated with the aperture, the flap structure including a plurality of interconnected flaps constructed and arranged to move generally simultaneously from an open position, permitting gasses to flow through the aperture into the arc chamber, to a closed position, closing the aperture to prevent gasses from flowing through the aperture and into the at least one compartment, wherein the flap structure includes actuating structure coupled with the plurality of interconnected flaps, wherein the at least one vent flap member, when moved to the open position thereof, being constructed and arranged to engage the actuating structure to move the plurality of interconnected flaps to the closed position thereof.

2. The system of claim 1, wherein the flap structure includes a box-like housing having a plurality of vent openings that communicate with the aperture, each interconnected flap being associated with a vent opening so as to close the vent opening in the closed position of the flap structure.

3. The system of claim 2, where each flap is a generally rectangular sheet-metal structure that is disposed generally transversely to the associated vent opening in the open position of the flap structure.

4. The system of claim 1, wherein each interconnected flap is coupled at one end thereof to a common link, another end of each interconnected flap being coupled to the housing via hinge structure.

5. The system of claim 4, wherein the actuating structure comprises a lever extending from the housing, the link being coupled to the lever such that rotation of the lever causes linear movement of the link which causes the interconnected flaps to move to the closed position.

6. The system of claim 5, further comprising springs biasing the interconnected flaps to the closed position and preventing the flaps from bouncing back when closed.

7. The system of claim 1, wherein the at least one compartment is part of a Type 2C switchgear enclosure and a circuit breaker of at least 2000 amps is housed in the at least one compartment.

8. The system of claim 2, wherein the housing is constructed and arranged to prevent ingress of gasses between the wall of the compartment and certain of the interconnected flaps.

9. The system of claim 1, wherein the flap structure is disposed in the arc chamber and, when the flap member opens, the flap member moves into the arc chamber to engage the actuating structure.

10. The system of claim 4, wherein the hinge structure is constructed and arranged to ensure that each flap can rotate in either of opposite directions so as to be disposed in the closed position and so that the when in the closed position, the flaps generally seal against a surface of the housing.

11. A method of containing internal arc gasses in a switchgear enclosure, the enclosure including at least one compartment for housing electrical components, the at least one compartment having an aperture through a wall thereof, the enclosure including a bus compartment for housing a main bus, the bus compartment including an opening through a wall thereof, with at least one vent flap member associated with the opening so as to normally close the opening, the at least one vent flap member being moveable to an open position to permit gasses to flow through the opening, the enclosure including an arc chamber in communication with the aperture and the opening, the method comprising: providing a closure structure associated with the aperture and constructed and arranged to move from an open position, permitting gasses to flow through the aperture into the arc chamber, to a closed position, closing the aperture to prevent gasses from flowing through the aperture and into the at least one compartment, and ensuring that when moved to the open position thereof, the at least one vent flap member engages a portion of the closure structure to cause the closure structure to move to the closed position thereof.

12. The method of claim 11, wherein the closure structure includes flap structure having a plurality of interconnected flaps, wherein the ensuring step comprises ensuring that the interconnected flaps move generally simultaneously from an open position to a closed position, thereby defining the closed position of the closure structure.

13. The method of claim 12, wherein the flap structure includes a box-like housing having a plurality of vent openings that communicate with the aperture, each interconnected flap being associated with a vent opening so as to close the vent opening in the closed position of the interconnected flaps.

14. The method of claim 13, where each flap is a generally rectangular sheet-metal structure that is disposed generally transversely to the associated vent opening in the open position of the interconnected flaps.

15. The method of claim 11, wherein each interconnected flap is coupled at one end thereof to a common link, another end of each interconnected flap being in hinged relation with the housing, a lever, extending from the housing being connected with the link, the ensuring step ensuring that rotation of the lever causes linear movement of the link which causes the interconnected flaps to move to the closed position thereof.

16. The method of claim 15, further comprising providing springs to bias the interconnected flaps to the closed position and to prevent the flaps from bouncing back when closed.

17. The method of claim 11, wherein the switchgear enclosure is of Type 2C and the method further provides a circuit breaker of at least 2000 amps housed in the at least one compartment.

18. The method of claim 13, further comprising preventing ingress of gasses between the wall of the compartment and certain of the interconnected flaps.

19. The method of claim 11, wherein the closure structure is disposed in the arc chamber and the ensuring step ensures that when the flap member opens, the flap member moves into the arc chamber to engage the portion of the closure structure.

20. The method of claim 12, wherein each interconnected flap is coupled at one end thereof to a common link, another end of each interconnected flap being coupled to a housing via hinge structure, the method providing that the hinge structure ensures that each flap can rotate in either of opposite directions so as to be disposed in the closed position and so that the when in the closed position, the flaps generally seal against a surface of the housing.

\* \* \* \* \*